(12) United States Patent
Wang

(10) Patent No.: US 12,528,682 B1
(45) Date of Patent: Jan. 20, 2026

(54) HANDLING EQUIPMENT, HANDLING EQUIPMENT CONTROL METHOD, AND CONTROLLER

(71) Applicant: VisionNav Robotics USA Inc., Acworth, GA (US)

(72) Inventor: Maosheng Wang, Acworth, GA (US)

(73) Assignee: VisionNav Robotics USA Inc., Acworth, GA (US)

( * ) Notice: Subject to any disclaimer, the term of this patent is extended or adjusted under 35 U.S.C. 154(b) by 0 days.

(21) Appl. No.: 19/220,949

(22) Filed: May 28, 2025

(51) Int. Cl.
*B66F 9/06* (2006.01)
*B66F 9/075* (2006.01)

(52) U.S. Cl.
CPC .......... *B66F 9/063* (2013.01); *B66F 9/07509* (2013.01)

(58) Field of Classification Search
CPC .............................. B66F 9/063; B66F 9/07509
See application file for complete search history.

(56) References Cited

U.S. PATENT DOCUMENTS

| 11,186,293 | B2* | 11/2021 | Gardner | ................ | B60W 50/10 |
| 2016/0090285 | A1* | 3/2016 | Svensson | ............ | G05D 1/0246 |
| | | | | | 700/300 |
| 2018/0144638 | A1* | 5/2018 | Alessi | .................... | G08G 1/166 |
| 2018/0220309 | A1* | 8/2018 | Gomes | ................. | G05D 1/0022 |
| 2019/0101901 | A1* | 4/2019 | Zimmermann | .. | G05B 19/41895 |
| 2019/0287405 | A1* | 9/2019 | Lewandowski | ......... | F16P 3/147 |
| 2020/0255235 | A1* | 8/2020 | Ruhland | ................ | B66F 9/0755 |
| 2022/0363528 | A1* | 11/2022 | Okamoto | .............. | B66F 9/0759 |
| 2023/0135834 | A1 | 5/2023 | Keller | | |

FOREIGN PATENT DOCUMENTS

JP 6879788 B2 5/2021

OTHER PUBLICATIONS

Kubasakova et al, I. Implementation of Automated Guided Vehicles for the Automation of Selected Processes and Elimination of Collisions between Handling Equipment and Humans in the Warehouse, Google Scholar, MDPI, Sensors, Feb. 2024, pp. 1-19. (Year: 2024).*

* cited by examiner

*Primary Examiner* — Russell Frejd
(74) *Attorney, Agent, or Firm* — MUNCY, GEISSLER, OLDS & LOWE, P.C.

(57) ABSTRACT

The present disclosure relates to a handling equipment, a handling equipment control method, and a controller. The handling equipment (100) includes a controller. The controller executes program instructions to implement the following steps: determining whether the handling equipment (100) carries a carrier (105); determining a vehicle speed of the handling equipment (100); setting a first protection region according to the vehicle speed and a first profile of the handling equipment (100) when the handling equipment (100) does not carry the carrier (105); and setting a second protection region according to the vehicle speed and a second profile of the handling equipment (100) when the handling equipment (100) carries the carrier (105).

20 Claims, 11 Drawing Sheets

HANDLING EQUIPMENT, HANDLING EQUIPMENT CONTROL METHOD, AND CONTROLLER

BACKGROUND OF THE INVENTION

Field of the Invention

The present disclosure relates to a handling equipment and a method for setting a safety protection region during operation of the handling equipment.

Description of the Prior Art

With rapid development of the logistics industry, handling equipments (for example, forklifts) are increasingly widely applied to warehouse logistics. With the unmanned warehousing systems developing toward high density and high flexibility, an autonomous navigation capability and a dynamic obstacle avoidance capability of an unmanned handling equipment (such as an AGV) become essential. Setting of a protection region is a core technology for ensuring safe operation of equipments, and multidimensional factors such as a carrier size, a vehicle speed, and environmental dynamics need to be taken into consideration, to balance space utilization and operation efficiency.

Currently, for an AGV, a protection region range is generally set according to a maximum carrier size. Consequently, when a small carrier (for example, a single cargo box) is being carried, a width of a protection region exceeds an actual requirement. Especially in a narrow passage (for example, the width is less than 3 m), false alarms are easily triggered due to overlapping of protection regions during vehicles meeting head-on. Consequently, the AGV decelerates or stops frequently, and efficiency is low. However, if maximum widths of two AGVs (and carriers of the two AGVs) are respectively less than 1.5 m, the two AGVs can actually pass each other. Therefore, setting the protection region range only according to the maximum carrier size tends to cause space waste and passage redundancy.

In addition, an AGV in current warehousing generally uses a fixed radius of a protection region (which is usually calculated based on a maximum vehicle speed), and does not consider a braking inertial difference in a low-speed scenario (for example, the speed is less than 2 m/s). For example, in case of a low speed, an excessively large protection region may occupy a neighboring lane, and in a case of a high speed (for example, the speed is greater than 3.5 m/s), an insufficient protection region increases a collision risk between AGVs or between an AGV and a fixed facility.

In the foregoing cases, because the protection region has a large and fixed range, a waiting time for vehicle meeting head-on is significantly increased, resulting in low AGV warehousing operation efficiency.

BRIEF DESCRIPTION OF THE DRAWINGS

The accompanying drawings are intended to provide further understanding of this disclosure and constitute a part of this disclosure. The drawings and the following specific implementations are used together for explaining this disclosure, but do not constitute a limitation on this disclosure. In the accompanying drawings.

DETAILED DESCRIPTION

Figure 1:
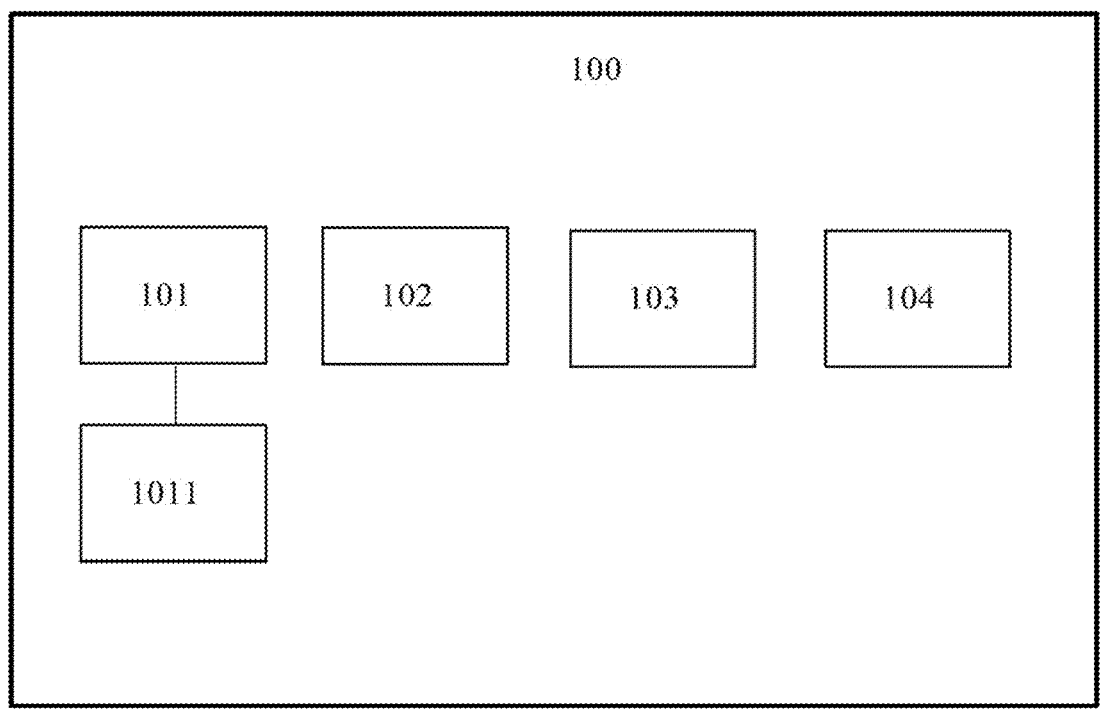
FIG. 1 is a schematic diagram of modules of a handling equipment according to an embodiment of this disclosure.

The following disclosed content provides various embodiments or illustrations that can be used to implement different features of the present disclosure. The assemblies and configured specific examples below are used to simplify the present disclosure. It is to be understood that such descriptions are merely illustrative and are not intended to limit the present disclosure. For example, in the following descriptions, forming a first feature on or over a second feature may include some embodiments in which the first and second features are in direct contact with each other; and may also include embodiments in which additional assemblies are formed between the first and second features, so that the first and second features may not be in direct contact. In addition, the present disclosure may reuse assembly symbols and/or numbers in a plurality of embodiments. Such reuse is intended for simplification and clarity and does not represent the relationship between different embodiments and/or configurations discussed.

An unmanned handling equipment (such as an AGV) is an equipment widely applied to intelligent logistics and automated warehousing, and can implement autonomous handling and access of goods without manual driving. The handling equipment is usually equipped with a sensor, a navigation system, and a controller, to ensure efficient and safe operation of the handling equipment. With rapid increase of modern logistics demands, unmanned handling equipments have become important tools for improving operation efficiency and reducing manpower costs.

A safety protection region of an AGV during operation needs to first ensure that the AGV does not collide with any fixed or mobile facility or human. To achieve this objective, in the related art, a range of a protection region is generally set according to a maximum carrier size. Although such a manner of setting the protection region meets a safety requirement to the greatest extent, the manner may not be an optimal solution.

In the related art, an AGV usually detects whether there is an obstacle in a protection region of the AGV by using a laser radar. An obstacle avoidance protection region of the laser radar is mostly set according to a maximum speed, a maximum rudder angle, a running area, and a path of the AGV. When there are diversified types and sizes of carriers for handling, a cargo carrying protection region can be planned only according to a maximum carrier size. In this case, regardless of a small-sized carrier or a large-sized carrier, a protection region needs to be planned according to the maximum carrier size. Consequently, when an AGV path is planned, a required passage is excessively wide and a protection region is excessively large, deceleration or stopping is often triggered during operation, causing frequent starting and stopping, and reducing efficiency. In addition, some passages originally planned as two-lane passages can only be used as one-way passages due to a protection region set according to a large-size carrier, further affecting operation efficiency of the AGV.

In view of this, this disclosure provides a handling equipment control method and a handling equipment applying the method, to resolve the problem.

For ease of description, related hardware of the handling equipment is defined as follows in the present disclosure:

A processor is responsible for performing core functions such as computation, control, and decision. The processor can receive data from a sensor, run a control algorithm, and the like, and instruct an executor to complete a task. Common processor types may include: a central processing unit (CPU), a digital signal processor (DSP), a microcontroller unit (MCU), and the like. The processor in this specification may refer to a processor set configured to execute a same task or different tasks.

A memory is configured to store data, a program algorithm, or the like. The memory in this specification may refer to a memory set configured to execute a same task or different tasks. Optionally, the processor, the sensor, and the controller in the present disclosure may all include respective memories/storage units.

A controller may generally include a processor and a memory at a hardware level. Optionally, the controller may further include parts such as an input/output interface, a mainboard, a peripheral circuit and element, and the like. At a software level, parts such as a control algorithm, an operating system, a communication protocol, and the like may be usually included. The controller in this specification may refer to a controller set configured to execute a same task or different tasks.

FIG. 1 is a schematic diagram of modules of a handling equipment 100 according to an embodiment of this disclosure. In some embodiments, the handling equipment 100 may include a controller 101, a fork 102, and sensors 103 and 104. The controller 101 includes a processor 1011. In some embodiments, the controller 101 or the processor 1011 is operatably coupled to the sensors 103 and 104. In some embodiments, the controller 101 or the processor 1011 cooperates with the sensors 103 and 104 to implement a method for setting a protection region of a handling equipment provided in this disclosure. In some embodiments, the controller 101 may be an integrated element. The controller 101 may be formed by one or more control units/processing units. The processor 1011 may include a computing unit or a core computing unit. The processor 1011 may receive data from the sensor 103/104 or another hardware device. The processor 1011 may process data from the sensor 103/104 or another hardware device.

In some embodiments, the sensors 103 and 104 may be an integrated element. The sensors 103 and 104 may be considered as formed by a plurality of sensor elements. The sensors 103 and 104 include, for example, but are not limited to, a laser radar, a visual sensor, and an inertial measurement unit.

Figure 2A:
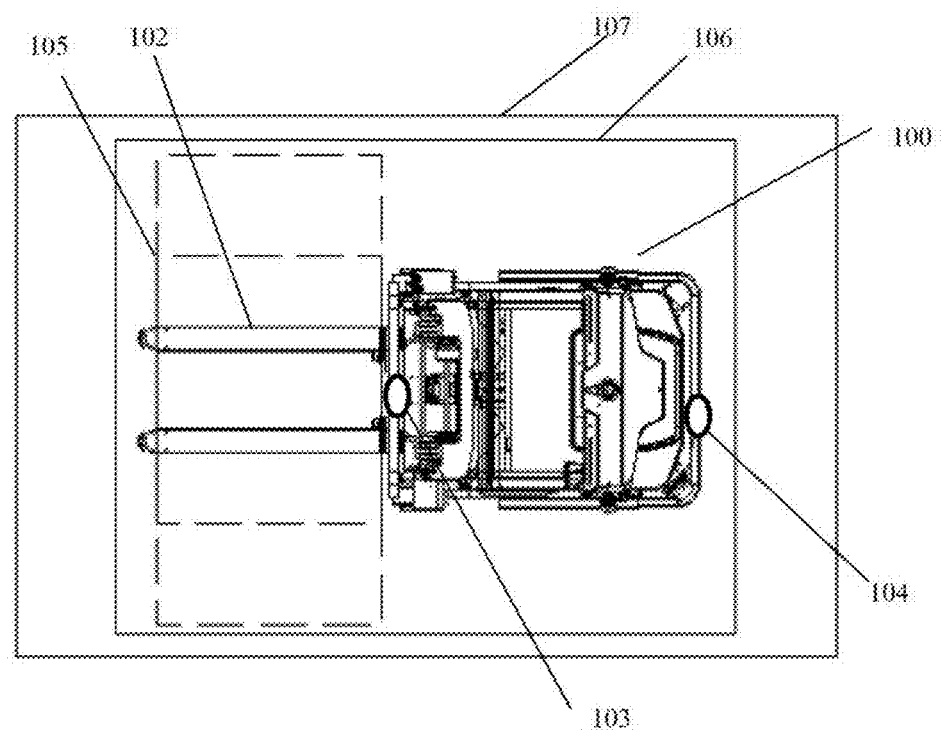
FIG. 2A is a schematic diagram of a handling equipment and a safety protection region thereof according to an embodiment of this disclosure.

FIG. 2A is a schematic diagram of a handling equipment 100 and a safety protection region thereof according to an embodiment of this disclosure. FIG. 2A merely exemplarily shows locations, types, and structures of components of the handling equipment 100, but does not constitute a limitation on the present disclosure. Provided that approximately the same function can be implemented, this disclosure is not limited to being performed completely according to the components shown in FIG. 2A. As shown in FIG. 2A, in an embodiment, the sensor 103 is arranged at a position close to a fork root of the fork 102 of the handling equipment 100, and the sensor 104 is arranged at the front of the head of the handling equipment 100. The sensors 103 and 104 may be a 2D or 3D laser radar. A detection range of a combination of the sensor 103 and the sensor 104 can cover a range of a protection region needed when the handling equipment 100 carries the largest carrier. In another embodiment, the handling equipment 100 includes only one sensor 103. A detection range of the sensor 103 can cover a range of a protection region needed when the handling equipment 100 carries the largest carrier. In an exemplary embodiment, the sensor 103 is arranged on a left side of the handling equipment 100 in the figure, and the sensor 104 is arranged on a right side of the handling equipment 100 in the figure (that is, in the front of the handling equipment 100). Locations of the sensor 103 and/or the sensor 104 are not limited to the locations in the foregoing embodiment, provided that a detection range of a single sensor or a combination of the sensors can cover a maximum protection region required by the handling equipment 100.

As shown in FIG. 2A, the fork 102 of the handling equipment 100 carries a carrier 105 of an allowed maximum size. The state of the fork 102 carrying a carrier is referred to as a "loaded" state of the handling equipment 100. In this case, a combination of the carrier 105 and the handling equipment 100 occupies a rectangular space 106. No obstacle can exist within the rectangular space 106; otherwise, the handling equipment 100 or the carrier 105 collides with the obstacle in the rectangular space 106, causing a safety accident. To ensure a safe operation of the handling equipment 100, a safety protection region 107 larger than the rectangular space 106 needs to be arranged. The protection region 107 covers the entire rectangular space 106. When the sensors 103 and 104 detect an obstacle at an inner boundary or within the protection region 107, the processor 1011 controls the handling equipment 100 to immediately stop.

In some embodiments, the carrier 105 is not the carrier of the maximum size. Therefore, the rectangular space 106 occupied by the combination of the handling equipment 100 and the carrier 105 is smaller than the rectangular space occupied by the combination of the handling equipment 100 and the carrier 105 when the carrier 105 is the carrier of the maximum size. Correspondingly, in this case, a range of the required protection region 107 is also properly smaller than the protection region required when the handling equipment 100 carries the carrier of the maximum size. The processor 1011 may set the protection regions 107 of different sizes according to the size and the specification of the carrier 105 instead of fixing all the time a range of the protection region 107 to a maximum protection region when the handling equipment 100 carries the largest carrier. Therefore, when the handling equipment 100 carries a carrier of a non-maximum size, a protection region that is different and smaller than the largest protection region is flexibly set, thereby saving space required for operation of the handling equipment 100, facilitating vehicle meeting head-on between handling equipments, reducing false reporting and false decelerations caused by overlapping of the protection regions, and improving operation efficiency.

In some embodiments, for a carrier of the same size, there are multiple protection regions 107. For example, the protection region 107 includes a first protection sub-region and a second protection sub-region. The first protection sub-region is smaller than the second protection sub-region and is completely within the second protection sub-region. In this way, the handling equipment 100 may set different processing policies for different protection sub-regions. Because the second protection sub-region is larger than the first protection sub-region, when the handling equipment 100 approaches an obstacle during operation, the sensors 103 and 104 first detect existence of the obstacle in the second protection sub-region. For example, when the sensors 103 and 104 of the handling equipment 100 detect an obstacle in the second protection sub-region and do not detect the obstacle in the first protection sub-region, and in this case, there is a distance (that is, a distance between a boundary of the first protection sub-region and a boundary of the rectangular space 106) between the obstacle and the rectangular space 106 in which collision may occur, the processor 1011 sends a deceleration instruction and controls the handling equipment 100 to decelerate, rather than immediately stop the handling equipment. In another example, when the sensors 103 and 104 of the handling equipment 100 detect an obstacle in the first protection sub-region, it indicates that the obstacle is very close to the boundary of the rectangular space 106 in which collision may occur. If the handling equipment 100 continues to travel, a collision safety accident is to occur. Therefore, when an obstacle is detected in the first protection sub-region, the processor 1011 sends a stop instruction and controls the handling equipment 100 to immediately stop.

In some embodiments, the protection region 107 further includes a third protection sub-region. The second protection sub-region is smaller than the third protection sub-region and is completely within the third protection sub-region. Similar to the setting of the first protection sub-region and the second protection sub-region, the third protection sub-region provides a larger protection space. Setting of the multiple protection sub-regions enables the processor 1011 to have more choices to control operations of the handling equipment 100 when the sensors 103 and 104 detect an obstacle in different protection sub-regions, to prevent collision between the handling equipment 100, the fork 102, or the carrier 105 and the obstacle. For example, when the sensors 103 and 104 first detect an obstacle in the third protection sub-region, in this case, the obstacle is farther from a boundary of the rectangular space 106 in which collision may occur than when the obstacle is detected in the second protection sub-region, and therefore, the processor 1011 sends a deceleration instruction and controls the handling equipment 100 to decelerate to a second speed. Further, when the sensors 103 and 104 detect an obstacle in the second protection sub-region again, it means that the obstacle is closer to the rectangular space 106 in which collision may occur. In this case, the processor 1011 sends a deceleration instruction and controls the handling equipment 100 to decelerate to a first speed, where the second speed is greater than or equal to the first speed.

Figure 2B:
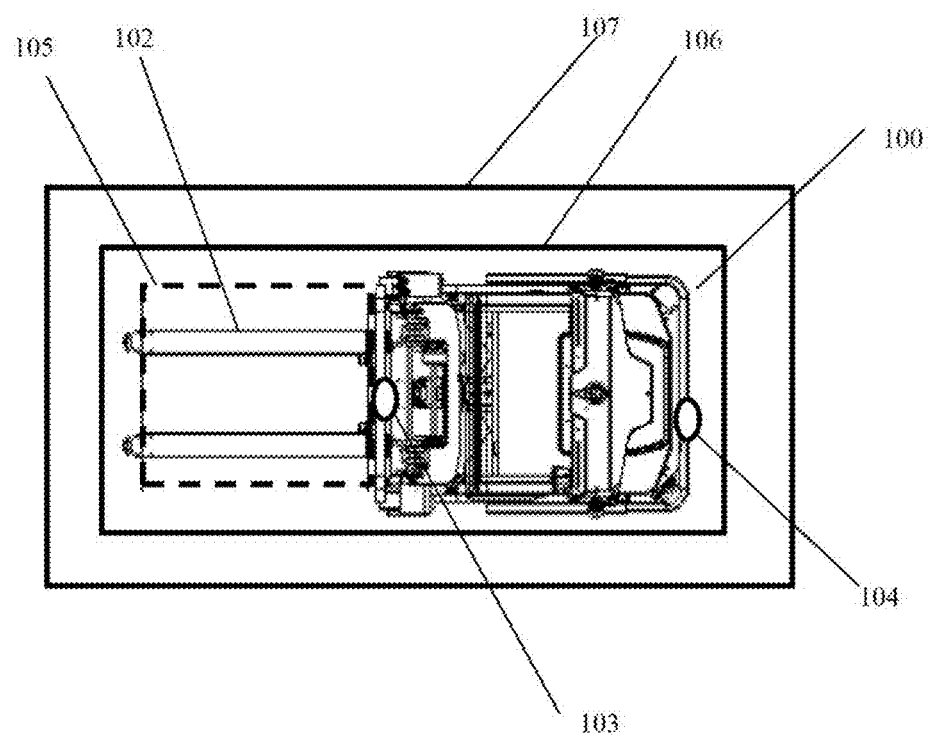
FIG. 2B is a schematic diagram of a handling equipment and a safety protection region thereof according to another embodiment of this disclosure.

FIG. 2B is a schematic diagram of a handling equipment 100 and a safety protection region thereof according to an embodiment of this disclosure. Different from FIG. 2A, the length of the carrier 105 shown by a dashed line on a fork 102 of the handling equipment 100 in FIG. 2B is not greater than the length of the fork 102, and the width of a carrier 105 is not greater than an unloaded maximum width of the handling equipment 100. Therefore, a profile of the handling equipment 100 forms a rectangular space 106. In the present disclosure, a "profile" is defined as a rectangle formed by a maximum length and a maximum width of an object to which the profile belongs. No obstacle can exist within the rectangular space 106; otherwise, the handling equipment 100 collides with the obstacle in the rectangular space 106, causing a safety accident. To ensure a safe operation of the handling equipment 100, a safety protection region 107 larger than the rectangular space 106 needs to be arranged. The protection region 107 completely cover the rectangular space 106. When the sensors 103 and 104 detect an obstacle at an inner boundary or within the protection region 107, the processor 1011 controls the handling equipment 100 to immediately stop. Similar to the embodiment in FIG. 2A, the protection region 107 may include one or more protection sub-regions, for example, a first protection sub-region, a second protection sub-region, and a third protection sub-region. The processor 1011 may set different processing policies for the multiple protection sub-regions, for example, set to restrict the handling equipment to having different vehicle speeds or stopping.

In another embodiment, the handling equipment 100 is unloaded (that is, a fork 102 do not carry a carrier 105, which is not shown). Similar to the situation in FIG. 2B, in this case, a profile of the handling equipment 100 occupies a rectangular space 106. A protection region 107 is set in the foregoing manner. The protection region 107 may include one or more protection sub-regions, for example, a first protection sub-region, a second protection sub-region, and a third protection sub-region. The processor 1011 may set different processing policies for the multiple protection sub-regions, for example, set to restrict the handling equipment 100 to having different vehicle speeds or stopping.

In subsequent embodiments, for ease of description, a part of the handling equipment 100 not including the fork 102 in FIG. 2A and FIG. 2B is referred to as a vehicle head or a vehicle head part.

Figure 3:
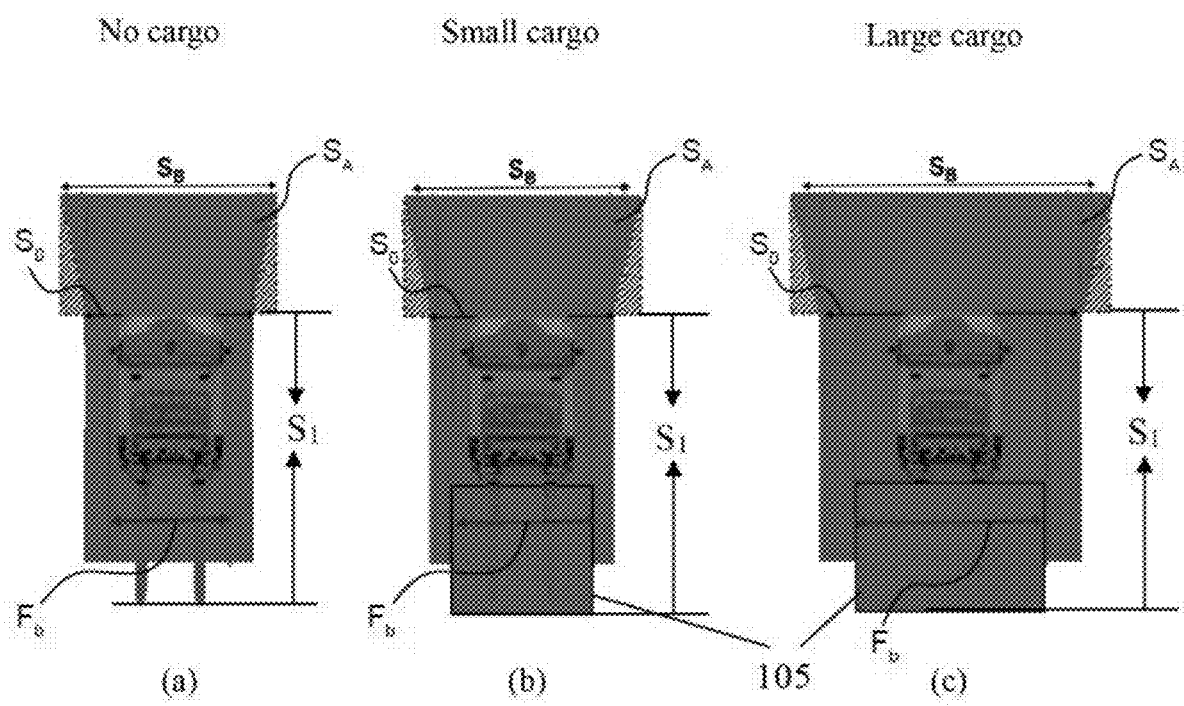
FIG. 3 is a schematic diagram of different safety protection regions of a handling equipment with different carriers according to an embodiment of this disclosure.

FIG. 3 is a schematic diagram of different safety protection regions of a handling equipment 100 in different cases according to an embodiment of this disclosure. FIG. 3(*a*) is a schematic diagram of a protection region of the handling equipment 100 in an unloaded state. $S_B$ represents the width of a front protection region of the handling equipment 100 when the handling equipment 100 operates in a straight line. $S_A$ represents the length of the front protection region when the handling equipment 100 operates in a straight line. So represents the width of a vehicle protection region when the handling equipment 100 operates in a straight line. The front protection region is defined in the present disclosure as a rectangular protection region located in front of the head of the handling equipment 100. The vehicle protection region is defined in the present disclosure as a rectangular protection region used for protecting the handling equipment 100 and the carrier. The vehicle protection region is formed by a rectangular region that encloses the vehicle of the handling equipment 100, the entire fork 102, and the entire carried carrier 105. Therefore, the area of the front protection region may be determined by $S_A * S_B$. The area of the vehicle protection region may be determined by $S_1 * S_0$, where $S_1$ represents the length of the vehicle protection region of the handling equipment 100. The length $S_1$ of the vehicle protection region is a sum of the vehicle length of the handling equipment 100 and the length of a fork when the carrier 105 is not carried, or is a sum of the vehicle length of the handling equipment 100 and a maximum length of the carrier 105 or the fork when the carrier 105 is carried.

The length of the vehicle protection region includes three cases:

(1) when the handling equipment 100 does not carry the carrier 105, $S_1$=the length of the vehicle head+the length of the fork; and (2) when the handling equipment 100 carries the carrier 105, and the length of the carrier 105≤the length of the fork 102, $S_1$=the length of the vehicle head+the length of the fork; or (1)

(3) when the handling equipment 100 carries the carrier 105, and the length of the carrier 105>the length of the fork 102, $S_1$=the length of the vehicle head+the length of the carrier.

FIG. 3(*b*) is a schematic diagram of a protection region when the handling equipment 100 carries a relatively small carrier 105. Definitions of $S_A$, $S_B$, $S_0$, and $S_1$ are the same as those in FIG. 3(*a*). A difference lies in that for $S_0$, if the processor 1011 determines that the width of the carrier 105 is less than or equal to an unloaded maximum vehicle width of the handling equipment 100, $S_0$ is still the same as $S_0$ when the handling equipment is unloaded. Otherwise, if the width of the carrier 105 is greater than the unloaded maximum width of the handling equipment 100, $S_0$ needs to be re-determined according to the width of the carrier 105 in a manner described in a subsequent embodiment. For $S_1$, if the processor 1011 determines that the length of the carrier 105 is less than or equal to the length of the fork 102 (that is, the case (2)), $S_1$ is equal to a sum of the length of the vehicle head and the length of the fork. Otherwise, if the length of the carrier 105 is greater than the length of the fork 102 (that is, the case (3)), $S_1$ is equal to a sum of the length of the vehicle head and the length of the carrier.

FIG. 3(*c*) is a schematic diagram of a protection region when the handling equipment 100 carries a relatively large carrier 105. Definitions of $S_A$, $S_B$, $S_0$, and $S_1$ are the same as those in FIGS. 3(*a*) and (*b*). In this embodiment, the width of the carrier 105 is greater than the unloaded maximum width of the handling equipment 100, and the length of the carrier 105 is greater than the length of the fork 102. Because the width of the carrier 105 is greater than the unloaded maximum width of the handling equipment 100, $S_0$ needs to be re-determined according to the width of the carrier 105 in a manner described in a subsequent embodiment. Because the length of the carrier 105 is greater than the length of the fork 102 (that is, the case (3)), $S_1$ is equal to a sum of the length of the vehicle head and the length of the carrier.

Figure 4:
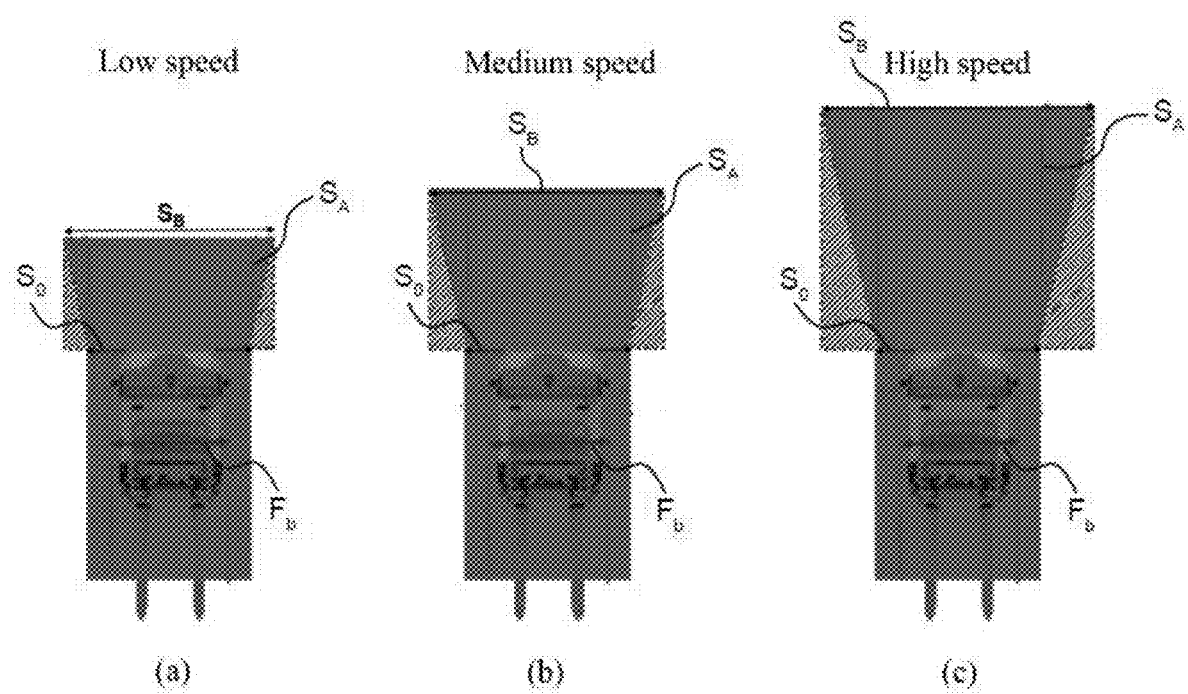
FIG. 4 is a schematic diagram of different safety protection regions of a handling equipment at different vehicle speeds according to an embodiment of this disclosure.

FIG. 4 is a schematic diagram of different safety protection regions of a handling equipment 100 at different vehicle speeds according to an embodiment of this disclosure. Generally, for a vehicle (for example, the handling equipment 100 in this disclosure), when other elements are the same, a faster speed of the vehicle indicates a longer braking distance. Therefore, for the handling equipment 100, in the best case, when the vehicle speed is relatively low, a relatively small protection region is set; and when the vehicle speed is relatively high, a relatively large protection region is set. In other words, in this disclosure, protection regions of different sizes are set according to different vehicle speeds. FIG. 4(*a*) shows that the handling equipment 100 has a relatively small protection region when the vehicle speed is relatively small; FIG. 4(*c*) shows that the handling equipment 100 has a relatively large protection region when the vehicle speed is relatively large; and FIG. 4(*b*) shows a medium-sized protection region between the relatively small protection region in FIG. 4(*a*) and the relatively large protection region in FIG. 4(*c*) when the vehicle speed is medium.

Figure 5:
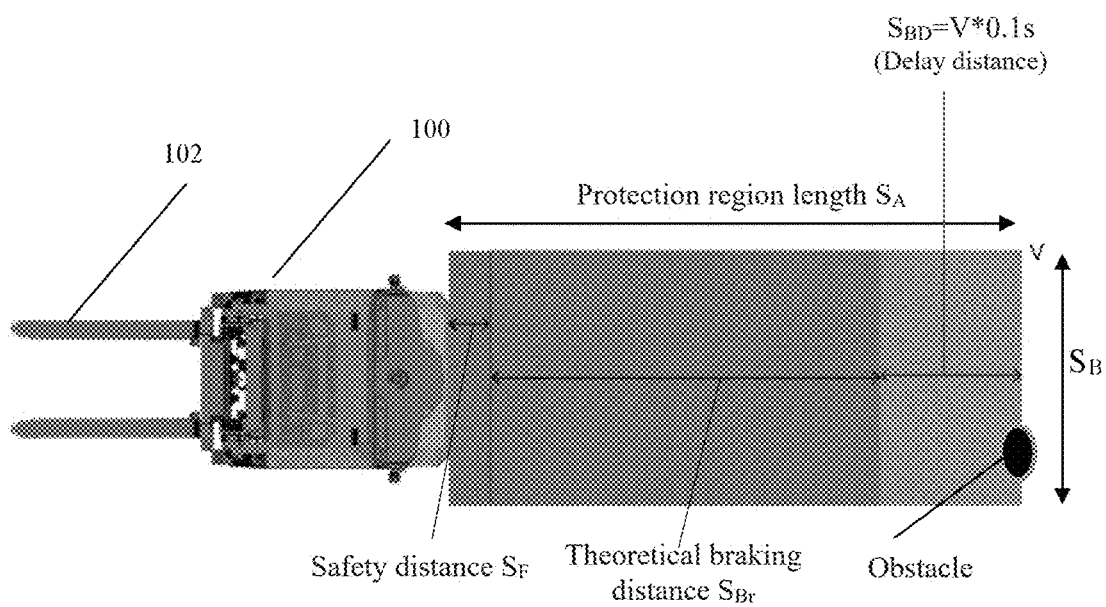
FIG. 5 is a schematic diagram of a range of a front protection region of a handling equipment according to an embodiment of this disclosure.

Further, FIG. 5 is a schematic diagram of a range of a front protection region of a handling equipment 100 according to an embodiment of this disclosure. The front protection region is a rectangular region having the length $S_A$ and the width $S_B$. When the handling equipment 100 travels forward at a speed $V_0$, there cannot be an obstacle in a front protection region shown in FIG. 5; otherwise, the handling equipment 100 may collide with the obstacle. For example, the sensor detects an obstacle at an edge of the front protection region shown in FIG. 5. The processor 1011 immediately sends an instruction indicating that the handling equipment 100 decelerates and stops. However, a signal delay of sending the instruction from the processor needs to be considered. The delay and other potential delays (for example, a delay of a transmission system of the handling equipment 100) may cause a lag from when the sensor detects an obstacle to when the handling equipment 100 starts to perform a deceleration and stop operation. In the present disclosure, it is found according to a practical operation that a total delay usually does not exceed 0.1 s. The delay causes the handling equipment to already travel forward by a distance $S_{BD}=V_0 t=0.1V_0$ from when the handling equipment detects the obstacle to when the handling equipment actually starts to decelerate. However, a total delay not exceeding 0.1 s does not constitute a limitation on the present disclosure. In another vehicle or another handling equipment, a total delay similar to that defined in the present disclosure may be less than, equal to, or greater than 0.1 s.

A theoretical braking distance $S_{Br}$ in FIG. 5 may be simplified as a uniform deceleration linear motion of the handling equipment 100 from the speed $V_0$ to 0 at an acceleration of a. Therefore, the calculation formulas of $S_{Br}$ and a current speed V are respectively as follows:

$$S_{Br}=V_0 t+0.5at^2$$

$$V=V_0+at$$

The acceleration a may be considered as a constant of the handling equipment 100.

When the handling equipment 100 is finally decelerated to 0, it may be obtained according to the foregoing formula that:

$$S_{Br} = \frac{V_0^2}{2a}$$

It can be seen that, a greater vehicle speed $V_0$ indicates a larger theoretical braking distance $S_{Br}$, that is, the vehicle speed $V_0$ is in positive correlation with the braking distance $S_{Br}$.

Therefore, from when the sensor detects that there is an obstacle in the front protection region to when the handling equipment 100 decelerates to 0, an actual forward travel distance of the handling equipment 100 is $S_{Br}+S_{BD}$. For safety, a redundant safety distance $S_F$ needs to be further set, to ensure that the handling equipment 100 still keeps a specific distance from the obstacle after being stopped as described above. In conclusion, the length of the front protection region in this disclosure is a sum of the braking distance and the redundant safety distance of the handling equipment 100. Specifically, the length $S_A$ of the front protection region is determined according to the following formula:

$$S_A = S_F + S_{Br} + S_{BD} \quad (2)$$

It can be seen that, a greater $S_{Br}$ indicates a larger $S_A$, that is, $S_{Br}$ is in positive correlation with $S_A$. Further, it may be determined according to the calculation formula of $S_{Br}$ that the vehicle speed $V_0$ is in positive correlation with $S_A$. Therefore, the vehicle speed $V_0$ is in positive correlation with (the size of) the front protection region. Because the protection region of the handling equipment 100 is formed by the front protection region and the vehicle protection region, the vehicle speed $V_0$ is also in positive correlation with (the size of) the protection region of the handling equipment 100.

Figure 6:
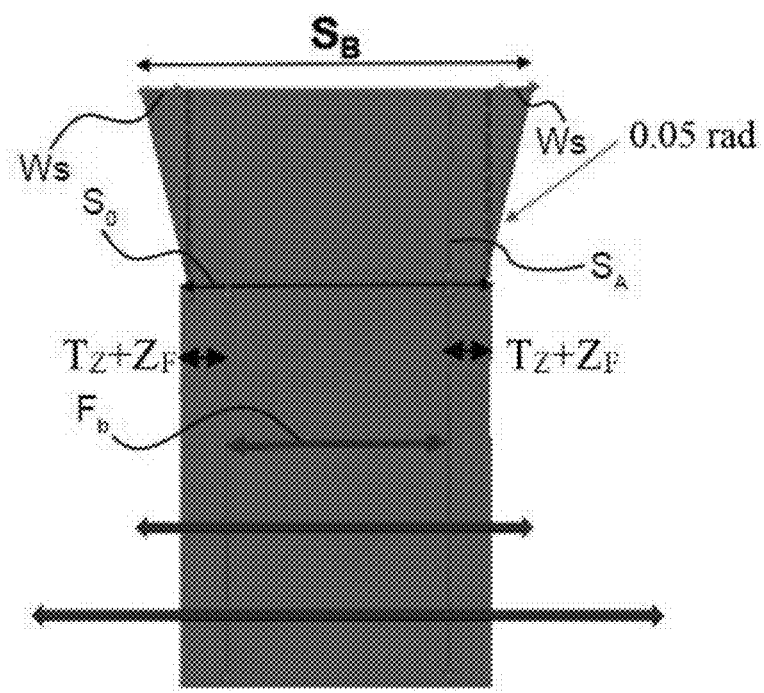
FIG. 6 is a schematic diagram of parameters related to a front protection region and a vehicle protection region of a handling equipment according to an embodiment of this disclosure.

Further, FIG. 6 is a schematic diagram of parameters related to a front protection region and a vehicle protection region of a handling equipment 100 according to an embodiment of this disclosure. Definitions of $S_A$, $S_B$, and $S_0$ in FIG. 6 are the same as that in FIG. 3 to FIG. 5. $F_b$ represents a maximum vehicle width of the handling equipment 100. The maximum vehicle width includes three cases:

(1) when the handling equipment 100 does not carry the carrier 105, $F_b$=the (unloaded maximum) vehicle width (of the handling equipment 100); and
(2) when the handling equipment 100 carries the carrier 105, and the width of the carrier 105≤the vehicle width, $F_b$=the vehicle width; or
(3) when the handling equipment 100 carries the carrier 105, and the width of the carrier 105>the vehicle width, $F_b$=the width of the carrier 105.

In some embodiments, for the protection region determined, for example, through scanning by a laser radar sensor, because there is a tolerance range $T_Z$ during scanning of a laser radar, (for example, a laser radar sensor whose tolerance range is ±65 mm is selected), the width of the protection region needs to be at least $F_b+T_Z$.

In a further embodiment, an additional safety width $Z_F$ further needs to be set. For example, an operator stands on the left or right side of the handling equipment 100, and faces the handling equipment 100 and stand next to the handling equipment 100. In this case, if a cargo accidentally falls, the instep of the operator may be pressed by the carrier 105 because the instep extends forward from the ankle. In another accident, sudden forward or backward movement of the handling equipment 100 may also cause a tire to roll over the instep that is extended forward by the operator, causing a safety accident. Based on this, for the safety protection region, an additional safety width $Z_F$ needs to be further set in consideration of a frontal extension of a foot of an operator. According to the length of an instep of an adult, $Z_F$ is preferably 180 mm, 190 mm, 200 mm, 210 mm, or the like. In addition, safety regions located at the left and right sides of the handling equipment need all include a redundant safety width ($T_Z+Z_F$).

In conclusion, for the vehicle protection region, the width of the vehicle protection region is a sum of the maximum width of the handling equipment 100 not carrying the carrier 105 or carries the carrier 105 and the redundant safety width, and the width $S_0$ of the vehicle protection region may be determined according to the following formula:

$$S_0 = F_b + 2(T_Z + Z_F) \quad (3)$$

In some other embodiments, for the width $S_B$ of the front protection region, in addition to considering an impact of the parameters included in $S_0$, an error $W_S$ of a transverse offset of a wheel (which is a wheel that steers the vehicle by using a steering execution mechanism) caused by jitter of a rudder angle (which is a deflection angle of the wheel relative to a traveling direction of the vehicle) when the handling equipment 100 travels straight further needs to be considered. In an embodiment, when the handling equipment 100 in this disclosure travels straight, a rudder angle jitters by about ±3° (about 0.05 rad). In this case, the transverse offset error or the deflection error $W_S$ of the wheel caused by jitter of the rudder angle is $W_S = S_A * \tan(0.05)$ or approximately $W_S = 0.05 S_A$. An error value of $W_S$ may be simultaneously generated on two sides of the handling equipment 100.

In conclusion, for the front protection region, the width of the front protection region is a sum of the maximum width of the handling equipment 100 not carrying the carrier 105 or carries the carrier 105, the deflection error when the handling equipment 100 travels straight, and the redundant safety width. Specifically, the width $S_B$ of the front protection region may be determined according to the following formula:

$$S_B = F_b + 2(T_Z + Z_F) + 2*0.05 S_A \quad (4)$$

However, it should be understood that the foregoing rudder angle jitter value does not constitute a limitation on the technical solution of this disclosure. This disclosure only limitedly lists relatively common parameters affecting the width of the protection region. A change in the width of the protection region caused by another rudder angle jitter value on another device or another parameter that is not named in this disclosure needs to be considered, and forms the protection scope of the present disclosure.

According to the above formulas (1) to (4) for calculating the length $S_A$ and width $S_B$ of the front protection region, and the length $S_1$ and width $S_0$ of the vehicle protection region, it can be determined that a larger unloaded profile or loaded profile of the handling equipment 100 indicates a larger unloaded protection region or loaded protection region of the handling equipment 100. That is, the unloaded profile or loaded profile of the handling equipment 100 is respectively in positive correlation with the unloaded protection region or loaded protection region of the handling equipment 100.

In addition, according to the formulas for calculating the length $S_A$ and the width $S_B$ of the front protection region, it can be determined that a larger unloaded profile or loaded profile of the handling equipment 100 indicates a larger front protection region when the handling equipment 100 is unloaded or loaded. That is, the front protection region of the handling equipment 100 is in positive correlation with the unloaded profile or the loaded profile. Similarly, according to the formulas for calculating the length $S_1$ and the width $S_0$ of the front protection region, it can be determined that a larger unloaded profile or loaded profile of the handling equipment 100 indicates a larger vehicle protection region when the handling equipment 100 is unloaded or loaded. That is, the vehicle protection region of the handling equipment 100 is in positive correlation with the unloaded profile or the loaded profile.

Figure 7:
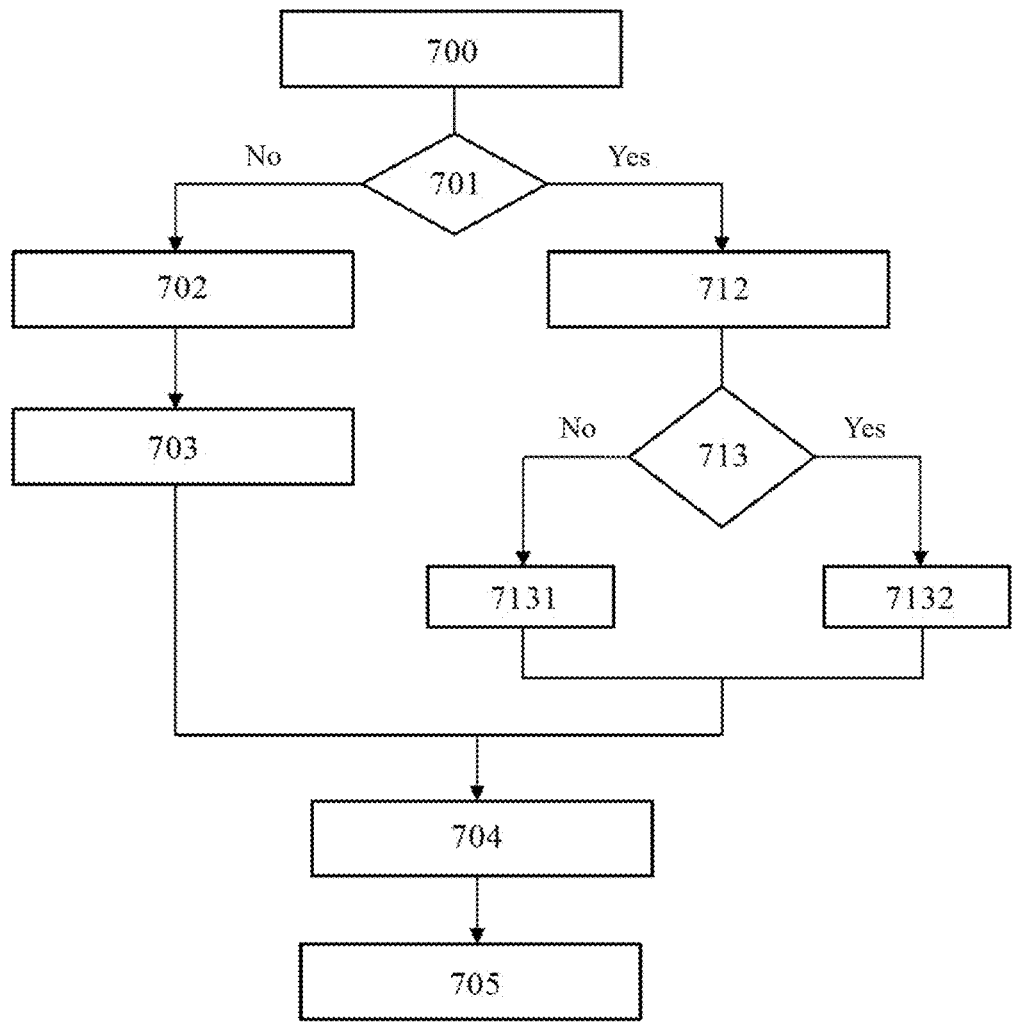
FIG. 7 is a schematic flowchart of switching between protection regions of a handling equipment according to an embodiment of this disclosure.

FIG. 7 is a schematic flowchart of switching between protection regions of a handling equipment 100 according to an embodiment of this disclosure. This disclosure is not limited to being performed completely according to procedure steps shown in FIG. 7, provided that the same results can be substantially obtained. It should be noted that the procedure steps shown in FIG. 7 are not completely limited to be applied to the handling equipment. In other embodiments, the procedure steps shown in FIG. 7 may be applied to any intelligent mobile apparatus. The subsequent embodiments are described by using the embodiments of FIG. 1 to FIG. 6 as examples. In some embodiments, steps of switching between the protection regions of the handling equipment 100 may be performed by different control units/processing units in the controller 101 or the processor 1011 or by a same control unit/processing unit.

In some embodiments, the steps of switching between the protection regions of the handling equipment 100 include:

Step 701: Determine whether the handling equipment 100 carries the carrier 105.

Step 704: Determine a current vehicle speed of the handling equipment 100.

Step 705: Set an unloaded protection region according to the vehicle speed and the unloaded profile of the handling equipment 100 when the handling equipment 100 does not carry the carrier 105; and set a loaded protection region according to the vehicle speed and the largest profile of the handling equipment 100 when the handling equipment 100 carries the carrier 105. Specifically, the unloaded profile is a first profile, the largest profile of the handling equipment when the handling equipment is unloaded or loaded is a second profile, the unloaded protection region is a first protection region, and a loaded protection region is a second protection region.

In some embodiments, the steps further include: Step 713: Determine a loaded profile when the handling equipment 100 carries the carrier 105.

Step 7131: Compare the loaded profile with the unloaded profile, and set the loaded profile as the largest profile if the loaded profile is larger than or equal to the unloaded profile.

In some embodiments, the steps further include:

Step 7132: Set the unloaded profile as the largest profile if the loaded profile is smaller than the unloaded profile.

In some embodiments, the steps further include:

The controller 101 of the handling equipment 100 controls the vehicle speed of the handling equipment 100 to decrease or controls the handling equipment 100 to stop when an object is detected in the unloaded protection region or the loaded protection region.

Step 701

In some embodiments, whether the fork 102 of the handling equipment 100 carries the carrier 105 is sensed in real time by using a sensor. For example, the processor 1011 may determine, by using a point cloud image obtained through scanning by a 2D or 3D laser radar, whether the handling equipment 100 is currently in an unloaded or cargo loading state.

Figure 8:
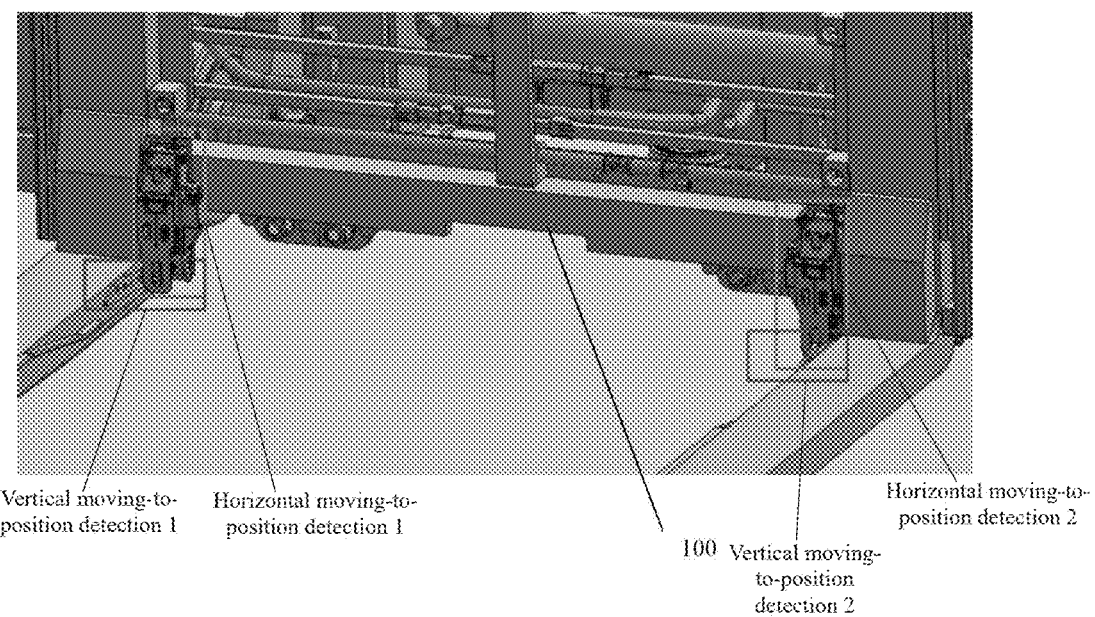
FIG. 8 is a schematic diagram of a mechanical sensor on a handling equipment configured to detect a load status according to an embodiment of this disclosure.

FIG. 8 is a schematic diagram of a mechanical sensor on a handling equipment 100 configured to detect a load status according to an embodiment of this disclosure. As shown in FIG. 8, mechanical horizontal moving-to-position sensors 1 and 2 and vertical moving-to-position sensors 1 and 2 are respectively arranged at fork roots of two forks 102 of the handling equipment 100. In some embodiments, when the fork 102 picks a cargo, a fork tip of the fork 102 is first inserted into a fork hole of the carrier 105 until the fork tip is completely inserted into the fork hole, triggering the horizontal moving-to-position sensor and the vertical moving-to-position sensor to send a loaded signal.

In some embodiments, one or more but not all of the horizontal moving-to-position sensors 1 and 2 and the vertical moving-to-position sensors 1 and 2 may send a loaded signal. In some possible cases, when the fork 102 picks the carrier, one side (for example, a left side) of the carrier 105 is relatively close to a fork root on the same side and the other side (for example, a right side) is relatively far from a fork root on the other side. For example, when the carrier 105 is inclined to the right side and the right side triggers a moving-to-position sensor first, the horizontal moving-to-position sensor 1 and the vertical moving-to-position sensor 1 send a loaded signal, but the horizontal moving-to-position sensor 2 and the vertical moving-to-position sensor 2 do not send a loaded signal. In this case, the handling equipment 100 continues to extend the fork toward the carrier 105, and stops extending the fork forward until detecting that both the horizontal moving-to-position sensor 2 and the vertical moving-to-position sensor 2 send a loaded signal.

In some embodiments, only one horizontal moving-to-position sensor and only one vertical moving-to-position sensor are arranged. In some other embodiments, only one horizontal moving-to-position sensor is arranged. In some other embodiments, only one vertical moving-to-position sensor is arranged. When the disposed only one horizontal moving-to-position sensor and/or vertical moving-to-position sensor sends a loaded signal, the processor 1011 further determines, through sensing data of the sensor (for example, the laser radar), whether the handling equipment 100 is already loaded.

In some embodiments, there may be an unexpected object (for example, a product accidentally left on the fork 102) on the fork 102 of the handling equipment 100, and the horizontal moving-to-position sensor and/or the vertical moving-to-position sensor is activated. In this case, the fork 102 is not inserted into the fork hole of the carrier 105. The processor 1011 of the handling equipment 100 further determines, by using the sensor, that the fork 102 is in an unloaded state. In this case, the processor 1011 sends an alarm of an incorrect cargo carrying state of the fork 102 to a host computer (for example, a central control room), suspends subsequent operation, and notifies operation and maintenance personnel to assist in processing.

Step 702

In some embodiments, it is determined, by using the method in step 701, that the handling equipment 100 is in the unloaded state.

Step 703

In some embodiments, after the processor 1011 determines that the handling equipment 100 is currently in the unloaded state, the processor 1011 reads and invokes preset data about the profile of the handling equipment 100 for a subsequent procedure. Specifically, the processor 1011 invokes pre-stored data about a maximum unloaded vehicle width and a maximum unloaded vehicle length (including the length of the fork 102) of the handling equipment.

In some embodiments, the processor 1011 determines data of a maximum vehicle width and a maximum vehicle length of the handling equipment 100 (not including the carrier 105) according to a real-time scanning result of the sensor. In some other embodiments, the processor 1011 compares data obtained from the sensor with preset data in a system, and uses the determined data of the maximum vehicle width and the maximum vehicle length in the step of determining the protection region range in a subsequent procedure if the data obtained from the sensor is consistent with the preset data in the system.

Step 712

In some embodiments, it is determined, by using the method in step 701, that the handling equipment 100 is in the loaded state.

Step 713

In some embodiments, after the processor 1011 determines that the handling equipment 100 is currently in the loaded state, the processor 1011 reads preset data about the profile of the handling equipment 100, for a subsequent procedure. Specifically, the processor 1011 invokes pre-stored data about a maximum unloaded vehicle width and a maximum unloaded vehicle length (including the length of the fork 102) of the handling equipment.

A range of the protection region of the handling equipment 100 is determined according to a maximum profile thereof, to ensure that all objects including the carrier 105 and the handling equipment 100 are included in the protection region. Therefore, in this step, the processor 1011 first needs to determine whether the loaded profile of the handling equipment 100 when the carrier 105 is carried is larger than the unloaded profile of the handling equipment 100. Specifically, the processor needs to determine whether the length and the width of the carrier 105 are respectively greater than the length of the fork 102 and the unloaded maximum width of the handling equipment 100.

Depending on different situations, the handling equipment 100 performs step 7131 or step 7132 next.

Case 1: When the Handling Equipment 100 Carries the Carrier 105, and the Loaded Profile of the Handling Equipment 100 is Smaller than or Equal to the Unloaded Profile of the Handling Equipment, Perform Step 7131

In some embodiments, the processor 1011 determines, based on comparison that the loaded profile is smaller than or equal to the unloaded profile of the handling equipment 100, that data of the unloaded profile (that is, the unloaded maximum vehicle width and the unloaded maximum vehicle length) of the handling equipment 100 is used in the step of determining the protection region range in a subsequent procedure.

Case 2: When the Handling Equipment 100 Carries the Carrier 105, and the Loaded Profile of the Handling Equipment 100 is Larger than Unloaded Profile of the Handling Equipment, Perform Step 7132

In some other embodiments, the processor 1011 determines, based on comparison that the loaded profile is larger than the profile of the handling equipment 100, that data of the loaded profile (that is, the loaded maximum vehicle width and the loaded maximum vehicle length) is used in the step of determining the protection region range in a subsequent procedure.

Step 704

The processor 1011 determines a current speed $V_0$ by invoking, for example, a rotational speed sensor arranged in a wheel of the handling equipment 100 or in another conventional speed measurement manner.

Step 705

When the handling equipment 100 carries a carrier 105, the processor 1011 substitutes the determined current vehicle speed $V_0$, the (unloaded or loaded) maximum vehicle width, the (unloaded or loaded) maximum vehicle length, and the acceleration a into the foregoing formulas (1) to (4), and therefore, determines ranges of the front protection region $S_A*S_B$ and the vehicle protection region $S_0*S_1$ that are set based on a current cargo carrying state and the current vehicle speed $V_0$.

In some embodiments, for example, when facing a relatively long straight path, the handling equipment 100 may properly increase the vehicle speed to improve efficiency. In this case, the processor may substitute a new vehicle speed into the foregoing formulas (1) to (4) and recalculate the ranges of the front protection region $S_A*S_B$ and the vehicle protection region $S_0*S_1$. On the contrary, in some other embodiments, for example, on a narrow passage or a passage with curves, the handling equipment 100 needs to properly reduce the vehicle speed, to ensure safety. In this case, the processor may substitute a reduced vehicle speed into the foregoing formulas (1) to (4) and recalculate the ranges of the front protection region $S_A*S_B$ and the vehicle protection region $S_0*S_1$.

In some embodiments, after the host machine (for example, a central control room) delivers a handling task and carrier information, when executing the task, the handling equipment 100 checks again, through a perception and detection system (for example, the sensor 103), whether the specification (for example, the length, the width, and the height) of the carrier 105 matches the carrier information delivered by the system. If the specification of the carrier 105 matches the carrier information, a fork picking operation is started. After cargo picking is completed, the horizontal and/or vertical moving-to-position sensor is triggered and caused to send the loaded signal. The processor 1011 further adjusts the range of the safety protection region according to the procedure and method shown in FIG. 7, to match with the loaded profile of the handling equipment 100 and a current vehicle speed of the handling equipment 100 when the carrier 105 is carried.

In some cases, in automated logistics warehouse, there is a requirement that a plurality of handling equipments meet on a same passage, to improve logistics handling efficiency. To ensure safety, protection regions of two handling equipments cannot overlap when the two handling equipments meet. Otherwise, there is a risk of collision. Therefore, in response to the requirement, the present disclosure provides procedure steps of determining whether a plurality of handling equipments are allowed to meet on a same passage. In an embodiment, steps of a vehicle meeting head-on procedure of two handling equipments include:

determining the width of a passage through which one or more of the handling equipments 100 are to pass;

determining a protection region of a first handling equipment in the handling equipments 100 on the passage, where the protection region of the first handling equipment is an unloaded protection region or a loaded protection region of the first handling equipment;

determining a protection region of a second handling equipment in the handling equipments 100 on the passage, where the protection region of the second handling equipment is an unloaded protection region or a loaded protection region of the second handling equipment;

determining whether a difference between a sum of the width of the protection region of the first handling equipment and the width of the protection region of the second handling equipment and the width of the passage is a negative value; and allowing the first handling equipment and the second handling equipment to operate on the passage if the difference is a negative value.

In some embodiment, steps of a vehicle meeting head-on procedure of two handling equipments further include:

at least disallowing the first handling equipment or the second handling equipment to pass through the passage if the difference is a non-negative value.

In some embodiment, steps of a vehicle meeting head-on procedure of two handling equipments further include:

The controller 101 controls the first handling equipment or the second handling equipment to perform the following operations if the difference is a non-negative value:

reducing a vehicle speed of the first handling equipment or the second handling equipment; and updating the protection region of the first handling equipment according to a reduced vehicle speed of the first handling equipment, or updating the protection region of the second handling equipment according to a reduced vehicle speed of the second handling equipment.

In some embodiment, steps of a vehicle meeting head-on procedure of two handling equipments further include:

determining whether a difference between a sum of the width of an updated protection region of the first handling equipment and the width of an updated protection region of the second handling equipment and the width of the passage is a negative value; and allowing the first handling equipment and the second handling equipment to operate on the passage if the difference is a negative value.

Figure 9:
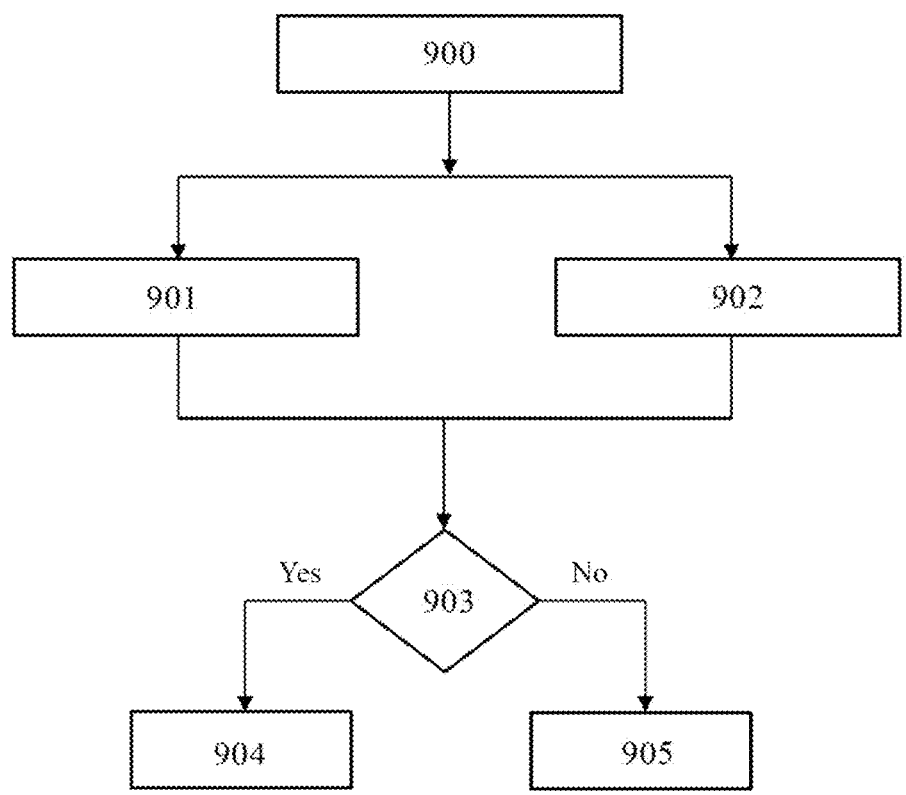
FIG. 9 is a schematic flowchart of vehicle meeting head-on of two handling equipments according to an embodiment of this disclosure.

FIG. 9 is a schematic flowchart of vehicle meeting head-on of two handling equipments 100 according to an embodiment of this disclosure.

In an embodiment, steps of a vehicle meeting head-on procedure of two handling equipments include:

Step 900: Separately start the first vehicle handling equipment and the second vehicle handling equipment.

Step 901: Determine a protection region of the first vehicle handling equipment according to the method shown in FIG. 7.

Step 902: Determine a protection region of the second vehicle handling equipment according to the method shown in FIG. 7.

Step 903: Determine whether respective protection regions of the two handling equipments overlap.

Step 904: Determine that the protection regions of the two handling equipments do not overlap, and allow vehicle meeting head-on.

Step 905: Determine that the protection regions of the two handling equipments at least partially overlap, and disallow vehicle meeting head-on.

Step 901

In some embodiments, when there is a handling equipment on a main passage executing a handling task, the host computer determines whether to allow another handling equipment to travel in the main passage in parallel. Specifically, the processor 1011 of the first vehicle handling equipment calculates, according to the method shown in FIG. 7, the protection region of the first vehicle handling equipment on the main passage by substituting a vehicle speed, an unloaded or loaded maximum vehicle width, and an unloaded or loaded maximum vehicle length into the formulas (1) to (4).

Step 902

In some embodiments, when there is a handling equipment on a main passage executing a handling task, the host computer determines whether to allow another handling equipment to travel in the main passage in parallel. Specifically, the processor 1011 of the second vehicle handling equipment calculates, according to the method shown in FIG. 7, the protection region of the first vehicle handling equipment on the main passage by substituting a vehicle speed, an unloaded or loaded maximum vehicle width, and an unloaded or loaded maximum vehicle length into the formulas (1) to (4).

Step 903

After respectively determining the protection regions of the first vehicle handling equipment and the second vehicle handling equipment in step 901 and step 902, the host computer further determines whether the main passage is sufficient to accommodate the first vehicle handling equipment and the second vehicle handling equipment at the same time while the protection regions of the first vehicle handling equipment and the second vehicle handling equipment do not interfere or overlap with each other.

Figure 10:
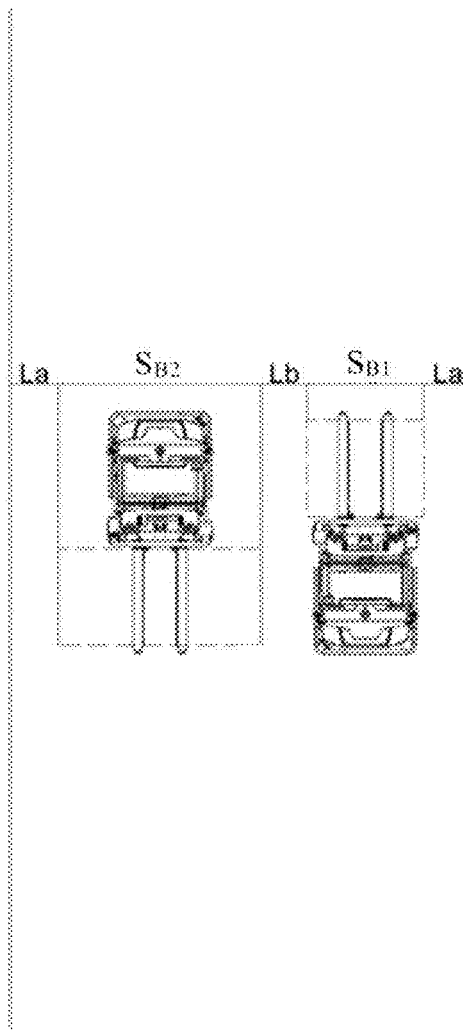
FIG. 10 is a schematic diagram of vehicle meeting head-on of two handling equipments on a passage according to an embodiment of this disclosure.

FIG. 10 is a schematic diagram of vehicle meeting head-on of two handling equipments on a passage according to an embodiment of this disclosure. As shown in FIG. 10, two handling equipments located on a same main passage meet and pass. Each handling equipment has a protection region determined according to the method shown in FIG. 7. A calculation manner of the width $S_B$ of each protection region is the same as that of the handling equipment 100 shown in FIG. 7. For ease of distinguishing, the width of the protection region of the first vehicle handling equipment is denoted as $S_{B1}$, and the width of the protection region of the second vehicle handling equipment is denoted as $S_{B2}$. Although theoretically, provided that the width of the main passage is greater than or equal to the sum $S_{B1}+S_{B2}$ of the widths of the respective protection regions of the two handling equipments, the two handling equipments can meet and pass through the main passage. But in practice, considering that the protection regions of the two handling equipments are excessively close, or distances between the protection regions and a passage boundary are excessively close, it is easy to cause error alarms of the sensor. Therefore, it is necessary to set an additional safety distance $L_b$ between the two handling equipments and a safety distance $L_a$ between each handling equipment and the passage boundary. Therefore, a minimum width of the main passage satisfying safe vehicle meeting head-on is $S_{B1}+S_{B2}+2L_a+L_b$. When the width of the main passage is greater than or equal to the minimum width, the host computer determines that the second handling equipment may enter the main passage and meet the first handling equipment already on the main passage. On the contrary, when the width of the main passage is less than the minimum width, the host computer determines that the second vehicle handling equipment cannot enter the main passage.

In some other embodiments, when there is a problem of whether two handling equipments can meet on the passage, similar to the foregoing embodiment, when the minimum width of the passage is determined, alternatively, a maximum vehicle width $F_b$ (which is unloaded or loaded) of each of the two handling equipments is used as the width of each protection region, where a definition of $F_b$ is similar to that of the maximum vehicle width $F_b$ in calculation of $S_B$ and $S_O$ of the protection region shown in FIG. 7. For ease of distinguishing, a maximum vehicle width of the first vehicle handling equipment is denoted as $F_{b1}$ and a maximum vehicle width of the second vehicle handling equipment is denoted as $F_{b2}$. In this case, a minimum width of the main passage satisfying safe vehicle meeting head-on is $F_{b1}+F_{b2}+2L_a+L_b$. When the width of the main passage is greater than or equal to the minimum width, the host computer determines that the second handling equipment may enter the main passage and meet the first handling equipment already on the main passage. On the contrary, when the width of the main passage is less than the minimum width, the host computer determines that the second vehicle handling equipment cannot enter the main passage.

In another embodiment, the host computer dynamically matches, based on profile parameters of a current handling equipment and the carrier 105, a carrier handling task of another handling equipment that can operate on a same main passage in parallel. It is assumed that a maximum vehicle width of the current handling equipment is $F_{b1}$, and the width of a protection region thereof is $S_{B1}$; and the maximum vehicle width of another handling equipment is $F_{b2}$, and the width of a protection region thereof is $S_{B2}$. The width of a passage is D. According to the method in the foregoing embodiment, at least one of $F_{b2}$ and $S_{B2}$ needs to satisfy the following condition:

$$F_{b2} \leq D - (F_{b1} + 2L_a + L_b) \quad (5)$$
$$S_{B2} \leq D - (S_{B1} + 2L_a + L_b)$$

The host computer delivers a cooperative instruction of a handling equipment satisfying the foregoing condition and repeats the foregoing planning procedure, so that a plurality of handling equipments can operate in parallel on a main road, as shown in FIG. 10. The mechanism significantly improves passage utilization by using a size adaptation algorithm and a dynamic task assignment policy.

Step 904

In an embodiment, the host computer determines that at least one of $F_{b2}$ and $S_{B2}$ of the second handling equipment satisfies the condition in formula (5), and therefore, allows the two handling equipments to meet on the passage.

Step 905

In an embodiment, the host computer determines that none of $F_{b2}$ and $S_{B2}$ of the second handling equipment satisfies the condition in formula (5), and therefore, does not allow the second handling equipment to enter the passage. In some embodiments, the host computer instructs the second handling equipment to suspend operation and wait for the first handling equipment to exit from the passage before allowing the second handling equipment to enter the passage. In some embodiments, the host computer reassigns a task to the third handling equipment satisfying the condition of formula (5), and allows the first handling equipment and the third handling equipment to meet on the passage.

In other embodiments, although the host computer determines that the second handling equipment does not satisfy the condition of $F_{b2}$ and $S_{B2}$ for meeting head-on on the passage, according to the foregoing embodiments of the present disclosure for determining the protection region of the handling equipment 100, since the width $S_B$ of the protection region is associated with the vehicle speed $V_0$ of the handling equipment 100, the host computer can: (i) determine the maximum $S_{B2}$ of the second handling equipment when the meeting head-on is allowed according to formula (5); and (ii) determine a maximum speed $V_{O2}$ of the second handling equipment by reverse deduction according to formulas (1) to (4). When the vehicle speed of the second handling equipment is less than or equal to $V_{O2}$, $S_{B2}$ satisfies the formula (5), so that the second handling equipment and the first handling equipment are allowed to meet on the passage.

In other embodiments, the host computer may send an instruction to reduce a speed $V_{O1}$ of the first handling equipment, and the processor 1011 recalculates and determines the width $S_{B1}$ of a reduced protection region of the first handling equipment according to formulas (1) to (4), so that $S_{B2}$ of the second handling equipment satisfies formula (5), that is, satisfies the vehicle meeting head-on condition of the two handling equipments on the passage.

In some other embodiments, the host computer may send an instruction to simultaneously reduce the vehicle speed $V_{O1}$ of the first handling equipment and the vehicle speed $V_{O2}$ of the second handling equipment, and the respective processors 1011 of the two handling equipments recalculate and determine the width $S_{B1}$ of the reduced protection region of the first handling equipment and the width $S_{B2}$ of the reduced protection region of the second handling equipment according to formulas (1) to (4), so that $S_{B2}$ of the second handling equipment to satisfies formula (5), that is, satisfies the vehicle meeting head-on condition of the two handling equipments on the passage.

In some other embodiments, for example, when the passage is relatively wide, the host computer can determine whether a sum of the widths $S_{B1}$, $S_{B2}$, and $S_{B3}$ of the protection regions of the three handling equipments is less than the width of the passage according to steps similar to the procedure steps shown in FIG. 9, and allow one, two, or all of the first handling equipment, the second handling equipment, and the third handling equipment to pass through the passage at the same time, as appropriate.

As used herein, the terms "approximately", "basic", "substantial", and "about" are used to describe and account for small variations. When used in conjunction with an event or circumstance, the terms may refer to examples of the exact occurrence of the event or circumstance as well as the extremely approximate occurrence of the event or circumstance. As used herein with respect to a given value or range, the term "about" generally means within ±10%, ±5%, ±1%, or ±0.5% of the given value or range. The range may be expressed herein as from one endpoint to the other endpoint, or between two endpoints. Unless otherwise specified, all ranges disclosed herein are inclusive of the endpoints. The term "substantially coplanar" may refer to two surfaces located within a few microns (μm) along the same plane, for example, within 10 μm, within 5 μm, within 1 μm, or within 0.5 μm located along the same plane. When referring to "substantially" same values or properties, the term may refer to values within ±10%, ±5%, ±1%, or ±0.5% of the mean of the values.

As used herein, unless otherwise specified in the context, the singular terms "a/an" and "the" may include a plurality of referents. In the descriptions of some embodiments, a component arranged "on" or "over" another component may encompass the case where the preceding component is directly on (for example, in physical contact with) the succeeding component, as well as the case where one or more intermediate components are located between the preceding component and succeeding component.

The foregoing has outlined features of several embodiments and detailed aspects of the present disclosure. The embodiments described in the present disclosure can be readily used as a basis for designing or modifying other processes and structures for performing the same or similar purposes and/or obtaining the same or similar advantages of the embodiments introduced herein. Such equivalent constructions do not depart from the spirit and scope of the present disclosure, and various changes, substitutions, and alterations can be made without departing from the spirit and scope of the present disclosure.

I claim:

1. A handling equipment, comprising: a controller, the controller executing program instructions to implement the following steps:
   determining whether the handling equipment carries a carrier;
   determining a vehicle speed of the handling equipment;
   setting a first protection region according to the vehicle speed and a first profile of the handling equipment when the handling equipment does not carry the carrier; and
   setting a second protection region according to the vehicle speed and a second profile of the handling equipment when the handling equipment carries the carrier,
   wherein each of the first protection region and the second protection region comprises a vehicle protection region, and
   wherein the first protection region encompasses an entirety of the handling equipment, and the second protection region encompasses entireties of the handling equipment and the carrier.

2. The handling equipment according to claim 1, wherein the steps further comprise:
   determining a loaded profile when the handling equipment carries the carrier;
   comparing the loaded profile with the first profile; and
   setting the loaded profile as the second profile if the loaded profile is larger than or equal to the first profile.

3. The handling equipment according to claim 2, wherein the steps further comprise:
   setting the first profile as the second profile if the loaded profile is smaller than the first profile.

4. The handling equipment according to claim 1, wherein the vehicle speed is in positive correlation with each protection region.

5. The handling equipment according to claim 1, wherein the first profile is in positive correlation with the first protection region.

6. The handling equipment according to claim 1, wherein the second profile is in positive correlation with the second protection region.

7. The handling equipment according to claim 1, wherein the steps further comprise:
   controlling, by the controller of the handling equipment when an object is detected in the first protection region or the second protection region, the vehicle speed of the handling equipment to decrease or controlling the handling equipment to stop.

8. The handling equipment according to claim 1, wherein each protection region comprises a front protection region.

9. The handling equipment according to claim 8, wherein the front protection region is in positive correlation with the vehicle speed.

10. The handling equipment according to claim 8, wherein
    the front protection region is in positive correlation with the first profile or the second profile.

11. The handling equipment according to claim 8, wherein the vehicle protection region is in positive correlation with the first profile or the second profile.

12. The handling equipment according to claim 8, wherein
    the front protection region and the vehicle protection region are both rectangular regions.

13. The handling equipment according to claim 12, wherein
    the width of the front protection region is a sum of a maximum width of the handling equipment not carrying the carrier or carrying the carrier, a deflection error of the handling equipment traveling straight, and a redundant safety width, and
    the length of the front protection region is a sum of a braking distance and a redundant safety distance of the handling equipment.

14. The handling equipment according to claim 12, wherein
    the width of the vehicle protection region is a sum of a maximum width of the handling equipment not carrying a carrier or carrying the carrier and a redundant safety width, and
    the length of the vehicle protection region is a sum of a vehicle length of the handling equipment and the length of a fork when the carrier is not carried, or is a sum of the vehicle length of the handling equipment and a maximum length of the carrier or the fork when the carrier is carried.

15. A handling equipment control method, comprising:
    determining the width of a passage through which one or more of the handling equipment according to claim 1 are to pass;
    determining a protection region of a first handling equipment in the handling equipment on the passage, wherein the protection region of the first handling equipment is a first protection region or a second protection region of the first handling equipment;
    determining a protection region of a second handling equipment in the handling equipment on the passage, wherein the protection region of the second handling equipment is a first protection region or a second protection region of the second handling equipment;
    determining whether a difference between a sum of the width of the protection region of the first handling equipment and the width of the protection region of the second handling equipment and the width of the passage is a negative value; and
    allowing the first handling equipment and the second handling equipment to operate on the passage if the difference is a negative value.

16. The method according to claim 15, further comprising:
    at least disallowing the first handling equipment or the second handling equipment to pass through the passage if the difference is a non-negative value.

17. The method according to claim 15, further comprising:
    controlling, by a controller, the first handling equipment or the second handling equipment to perform the following operations if the difference is a non-negative value:
    reducing a vehicle speed of the first handling equipment or the second handling equipment; and
    updating the protection region of the first handling equipment according to a reduced vehicle speed of the first handling equipment, or updating the protection region of the second handling equipment according to a reduced vehicle speed of the second handling equipment.

18. The method according to claim 17, further comprising:
    determining whether a difference between a sum of the width of an updated protection region of the first handling equipment and the width of an updated protection region of the second handling equipment and the width of the passage is a negative value; and allowing the first handling equipment and the second handling equipment to operate on the passage if the difference is a negative value.

19. A handling equipment control method, comprising: controlling a handling equipment to perform the following steps:

determining whether the handling equipment carries a carrier;

determining a vehicle speed of the handling equipment;

setting a first protection region according to the vehicle speed and a first profile of the handling equipment when the handling equipment does not carry the carrier; and setting a second protection region according to the vehicle speed and a second profile of the handling equipment when the handling equipment carries the carrier, wherein each of the first protection region and the second protection region comprises a vehicle protection region, and wherein the first protection region encompasses an entirety of the handling equipment, and the second protection region encompasses entireties of the handling equipment and the carrier.

20. A controller, configured to execute program instructions, to perform the following steps:

determining whether a handling equipment carries a carrier;

determining a vehicle speed of the handling equipment;

setting a first protection region according to the vehicle speed and a first profile of the handling equipment when the handling equipment does not carry the carrier; and setting a second protection region according to the vehicle speed and a second profile of the handling equipment when the handling equipment carries the carrier, wherein each of the first protection region and the second protection region comprises a vehicle protection region, and wherein the first protection region encompasses an entirety of the handling equipment, and the second protection region encompasses entireties of the handling equipment and the carrier.

* * * * *